D. S. GRAY.
Bee Hive.
No. 48,768.
Patented July 11, 1865.
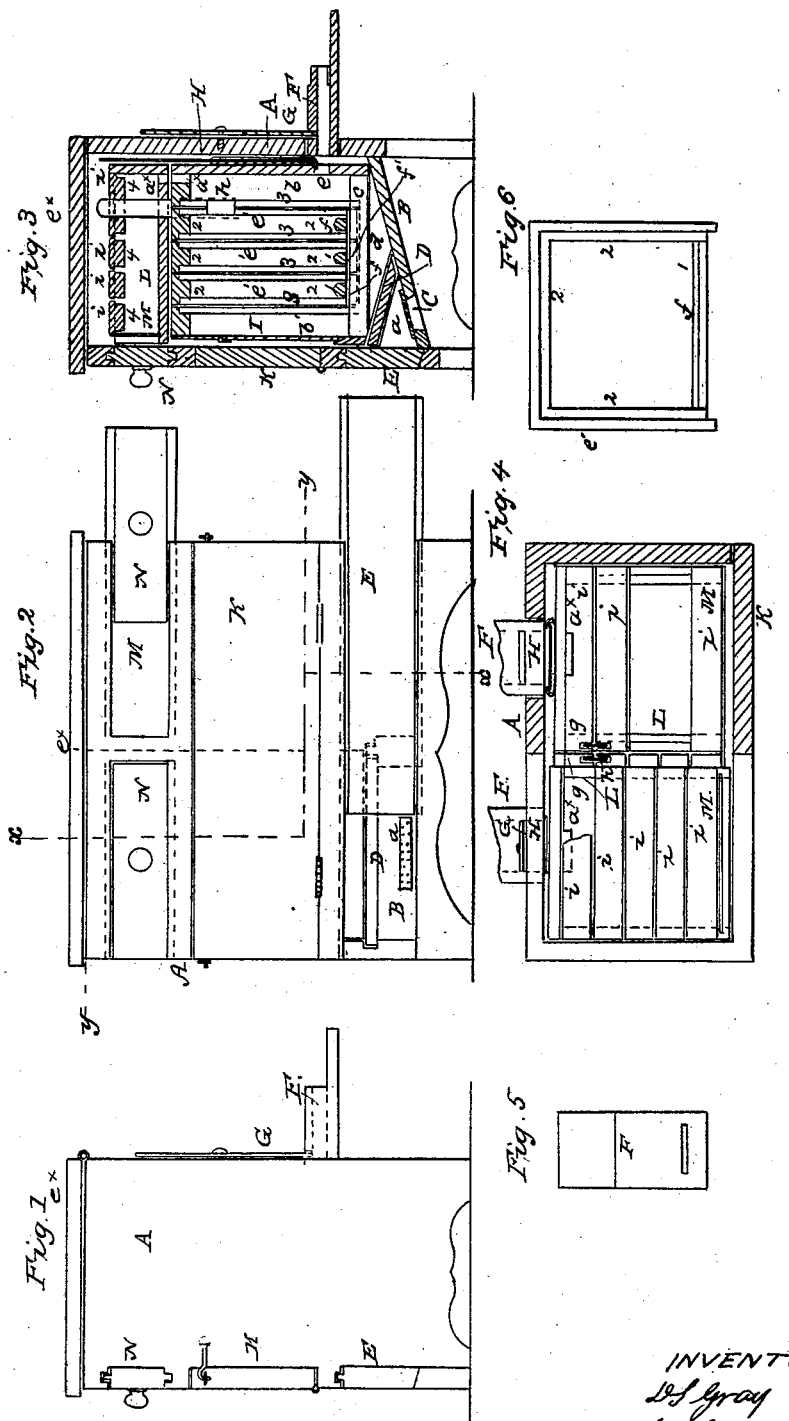

UNITED STATES PATENT OFFICE.

D. S. GRAY, OF ONARGA, ILLINOIS, ASSIGNOR TO HIMSELF AND M. H. MESSER, OF SAME PLACE.

IMPROVEMENT IN BEE-HIVES.

Specification forming part of Letters Patent No. 48,768, dated July 11, 1865.

*To all whom it may concern:*

Be it known that I, D. S. GRAY, of Onarga, in the county of Iroquois and State of Illinois, have invented a new and Improved Bee-Hive; and I do hereby declare that the following is a full, clear, and exact description thereof, which will enable those skilled in the art to make and use the same, reference being had to the accompanying drawings, forming part of this specification, in which—

Figure 1 is an end view of my invention; Fig. 2, a side view of the same; Fig. 3, a vertical section of the same, taken in the line $x\,x$, Fig. 2; Fig. 4, a plan sectional view of the box, taken in the line $y\,y$; Fig. 5, a detached plan view of a bee-entrance pertaining to the same; Fig. 6, a detached view of a comb-frame pertaining to the same.

Similar letters of reference indicate corresponding parts.

This invention relates to a new and improved bee-hive of that class commonly termed "parlor" or "window" hives, in consequence of being constructed and arranged in such a manner that the progress of the work of the bees may be witnessed at any time, and the hive placed in a window of an apartment, or so arranged that the hive may be within an apartment and the bees afforded free ingress and egress from the outer side of the building.

The invention consists in a novel construction of the hive, whereby the same may be kept in a clean condition and well ventilated, and all parts of the hive rendered accessible for the removal of honey, foul comb, or other purposes necessary in bee-culture.

A represents a quadrilateral box, of any suitable dimensions, and provided with an inclined bottom, B, having openings or holes C made in it, which are covered with wire-gauze or perforated metal plates $a$, to admit air and at the same time prevent the intrusion of insects.

D represents slides placed in the lower part of the hive, one at each side of the central cleat, and having an inclined position reverse to that of bottom B, and at the rear side of the hive there is a sliding door, E, by shoving aside which the slides D are rendered accessible.

The bee-entrances to the hive are through two horizontal tubes, F F, the bottoms of which project beyond the upper surfaces to form alighting-boards, (see Fig. 3,) and these entrances may be closed wholly or partially by means of vertical slides G, arranged or applied to the front side of the hive.

Within the hive or box A there are placed two compartments. Two, at least, are shown in this instance; but more may be used, or only one, if necessary. These compartments are composed of a series of rectangular comb-frames, the front and rear ones, $b\,b'$, of which are permanently secured at their lower ends to two horizontal bars, $c\,c$, which rest on cleats $d$, secured permanently in the lower part of the hive or box. The front frame, $b$, is closed in front, and has an oblong slot, $e$, made in it in line with an entrance or tube, F, and this slot may also be partially or wholly closed by a slide, H. The rear frame, $b'$, is provided with a glass, I, above which there is a perforated metal plate, J.

At the rear of the hive or box there is a door, K, hinged at its lower edge. By letting down this door the interior of the compartments, and consequently the progress of the work, may be seen. A space is allowed between the rear of the compartments and the rear side of the hive or box, as shown clearly in Fig. 3.

The remaining parts of the compartments are composed of rectangular frames $e'$, the lower ends of the side pieces of which lap or fit over cleats formed by rabbeting the bars $c\,c$, to which the lower ends of the front and rear frames, $b\,b'$, are secured. These intermediate frames, $e'$, are provided with bottom bars, $f$, the upper surfaces of which are beveled to form an angular edge, 1, running longitudinally and centrally their whole length. The inner surfaces of the top and sides of the frames $e'$ are rabbeted at each edge to form projections 2, which, when the several frames are adjusted in place, have spaces or grooves 3 between them, as shown in Fig. 3. These projections 2 and angular edges 1 form comb-guides to enable the bees to form their combs in vertical planes with spaces between them, so that the comb of one frame will not interfere with that of the adjoining ones. These several frames, when placed or adjusted between the frames $b\,b'$, form close compartments or boxes; and spaces are allowed between the bottom bars, $f$, for the free escape of filth or dirt, which falls upon the inclined bottom B, and may be readily removed at any time by withdrawing slides D. Air may also be admitted at any time within the hive by withdrawing said slides, and food supplied to them at any time by the same means.

In order to form a communication between the two compartments at any time, there is an opening, $g$, made in their adjoining sides, each opening being provided with a slide, $h$. (See Figs. 3 and 4.) By this arrangement and the slides G H one compartment may be kept empty or unoccupied until the other is filled, or two separate colonies may be allowed to work within the same box, thus forming a non-swarming hive.

In the upper part of the box A, above the working-compartments just described, there are placed spare-honey boxes L, the tops of which are composed of a series of slats, $i$, rabbeted at each edge to form projections 4 to serve as comb-guides. These slats $i$ are separate or independent one from another, and hence each comb may be raised and taken out separately from the box. The same advantage attends the construction of the bee-working compartments, as the frames $e'$ may each be removed or withdrawn separately.

The rear sides of the boxes L are provided with a glass, M, and slides N N are placed in the upper part of the rear side of the box A, by shoving aside which the interior of the spare-honey boxes may be seen.

Openings $a^x$ are made in the bottoms of the spare-honey boxes L and tops of the bee-working compartments, to admit of the bees passing from one to the other, and these openings may be closed, when necessary, by slides.

The whole arrangement is extremely simple and efficient, and affords facilities for manipulating and working with the bees not possessed, it is believed, by other hives of the same class in present use.

The box A is provided with a lid, $e^x$, which renders the spare-honey boxes L accessible.

I claim as new and desire to secure by Letters Patent—

In combination with the inclined bottom B and sliding door E, constructed and arranged as described, the slides D, for facilitating the removal of filth, &c., from the hive, as explained.

D. S. GRAY.

Witnesses:
PRICE DEMPSEY,
EDWARD RUMLEY.